United States Patent [19]

Johnston

[11] 4,344,021
[45] Aug. 10, 1982

[54] SYSTEM FOR COMPENSATING FOR TRANSFER CHARACTERISTIC VARIATIONS OF ELECTRON GUNS

[75] Inventor: Loren B. Johnston, Princeton, N.J.

[73] Assignee: RCA Corporation, New York, N.Y.

[21] Appl. No.: 170,742

[22] Filed: Jul. 21, 1980

[51] Int. Cl.³ .................................................. H01J 29/52
[52] U.S. Cl. .................................... 315/383; 315/366; 315/367
[58] Field of Search ................. 315/366, 367, 383, 307

[56] References Cited

U.S. PATENT DOCUMENTS

| | | | |
|---|---|---|---|
| 4,080,630 | 3/1978 | Marlowe | 358/242 |
| 4,086,579 | 4/1978 | Easter | 315/383 X |
| 4,121,137 | 10/1978 | Credelle | 315/383 X |
| 4,126,814 | 11/1978 | Marlowe | 315/307 |
| 4,234,825 | 11/1980 | Gange | 315/383 |
| 4,251,755 | 2/1981 | Bryden | 315/383 |
| 4,271,377 | 6/1981 | Gange et al. | 315/366 |

Primary Examiner—Malcolm F. Hubler
Attorney, Agent, or Firm—Eugene M. Whitacre; Dennis H. Irlbeck; Lester L. Hallacher

[57] ABSTRACT

The minimum output level of an electron gun driven at discrete voltage levels is precisely established. A target value slightly above the minimum voltage level is compared with the actual value. The result of the comparison is used to uniformily establish the minimum electron gun drive voltage and thus compensates for electron gun transfer characteristic differences and variations within the gun drive circuitry. An additional circuit utilizing a target value slightly below the maximum voltage can be used to establish the maximum output level of the electron gun.

16 Claims, 5 Drawing Figures

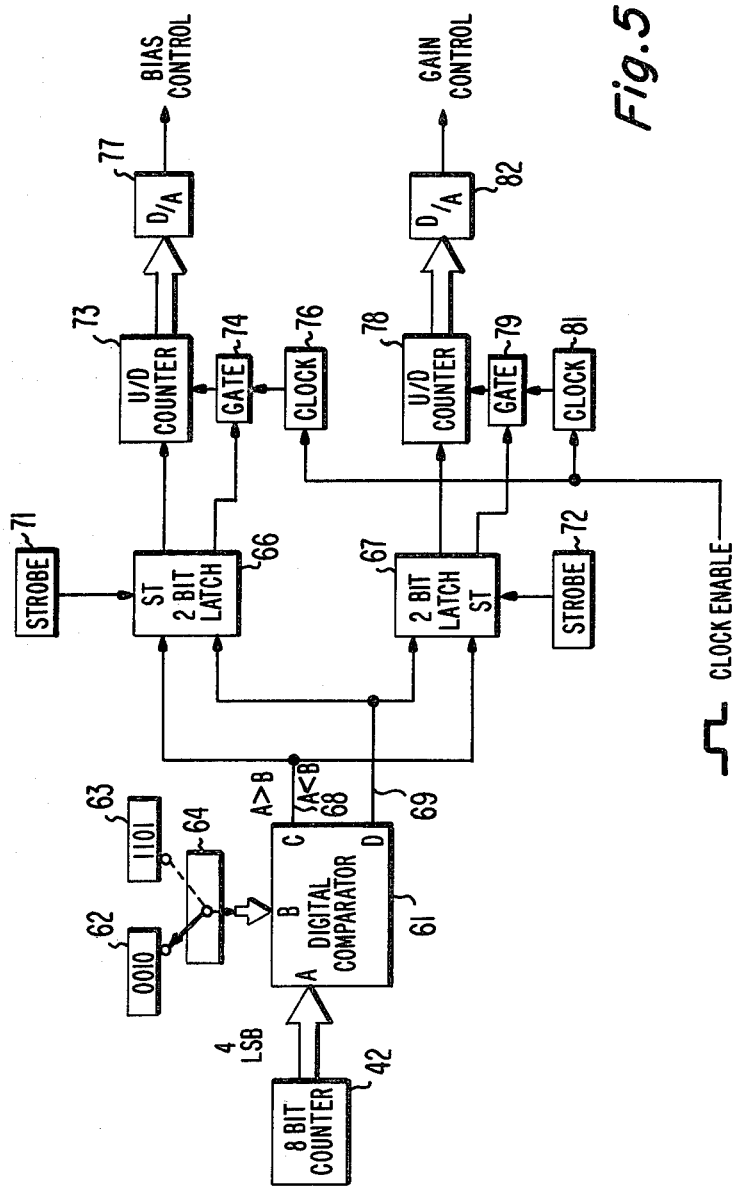

SYSTEM FOR COMPENSATING FOR TRANSFER CHARACTERISTIC VARIATIONS OF ELECTRON GUNS

BACKGROUND OF THE INVENTION

This invention relates generally to flat panel display devices and particularly to a system for compensating for transfer characteristic variations of the electron guns of such a device.

U.S. Pat. No. 4,126,814 issued to F. J. Marlowe discloses a system for uniformly controlling the visual display brightness of a modular flat panel display device. The display device is divided into a plurality of channels, each of which contributes a portion of every horizontal line of the visual output. Such display devices are known in the art as modular display devices. The visual display of a modular device is acceptable only when the display brightness of every channel is uniform within the perception capability of the human eye.

Additionally, the display brightness of the modules must be uniform within approximately 1% to assure that the seams between the modules are invisible. In a modular display device every channel uses a different electron gun. The electron guns and their associated circuitry typically do not have uniform transfer characteristics and, therefore, the display brightness of the channels will vary along with the transfer characteristic variations. The Marlowe system addresses this problem by storing the brightness drive voltages required to produce 64 different predetermined levels of picture brightness for each of the electron guns. The stored drive voltages are selected from a voltage range which is divided into 256 equal incremental voltages. The electron gun is driven by the incremental voltages and the voltages produced on an electron collector are compared with a reference voltage. The incremental voltage which brings the collector voltage up to the reference voltage is then stored. This procedure is repeated for 64 reference voltages so that 64 of the 256 incremental drive voltages are stored. Accordingly, uniform brightness for all modules in the display is achieved because the brightness levels for all the modules are referenced to the same 64 reference voltages. However, because the electron gun transfer characteristics vary, the drive voltage range from which the 256 incremental voltages are selected must be sufficiently broad to include the electron gun with the greatest cut off voltage at the low end and the gun which requires the most drive to achieve maximum brightness at the high end. In many instances the electron gun characteristics are widely different so that the 256 incremental drive voltage range must be expanded to include both these guns and as a consequence brightness resolution is lost.

The instant invention is directed to a system for adjusting the stored drive voltages to the electron guns utilized in a modular display device so that the drive voltage range is the same for all the electron guns and a maximum number of the 256 incremental brightness drive voltages can be utilized for all of the electron guns.

SUMMARY OF THE INVENTION

A uniform brightness control system for biasing the grids of electron guns has means for providing digital signals representative of the brightness levels and includes an adaptive circuit for establishing the values of the limits of the brightness levels to compensate for variations in the transfer characteristics of the electron guns. The adaptive circuit includes means for receiving the digital signals and at least one target signal and providing a control signal having a polarity which is determined by the polarity of the difference between the digital signal and the target signal. The control signal is utilized to produce an adjustment signal having a polarity representative of the control signal. The adjustment signal is applied to the video drive circuit to change the bias voltage on the grid of the electron gun in accordance with the selected brightness level.

BRIEF DESCRIPTIONS OF THE DRAWINGS

FIG. 1 is a perspective view, partially broken away, of a flat panel display device in which the preferred embodiment can be utilized.

FIG. 2 is a preferred embodiment of the instant invention incorporated into a simplified block diagram of the Marlowe system disclosed in U.S. Pat. No. 4,126,814.

FIG. 5 is another preferred embodiment.

DETAILED DESCRIPTION OF THE PREFERRED EMBODIMENTS

Figure 1:
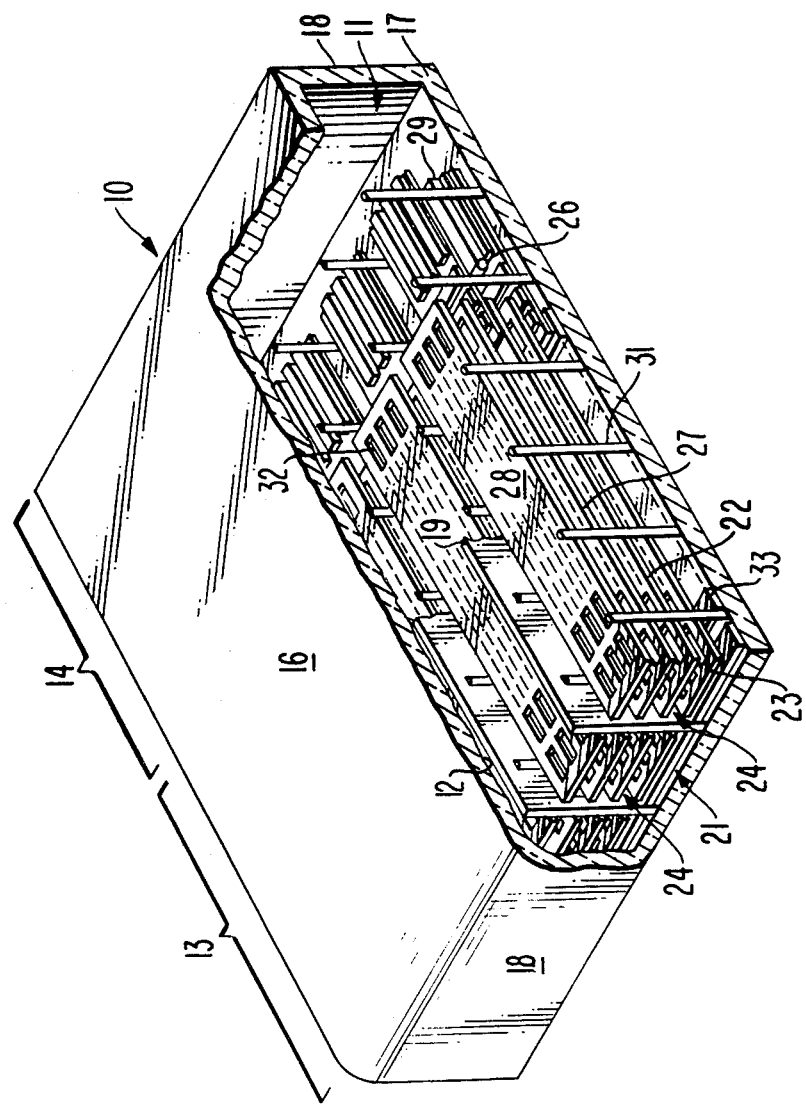

In FIG. 1 a flat panel display device 10 in which the preferred embodiment can be utilized includes an evacuated envelope 11 having a display section 13 and an electron gun section 14. The envelope 11 includes a faceplate 16 and a baseplate 17 held in a spaced parallel relationship by sidewalls 18. A display screen 12 is positioned along the faceplate 16 and gives a visual output when struck by electrons.

A plurality of spaced parallel support vanes 19 is arranged between the front wall 16 and the baseplate 17 to provide the desired internal support against external atmospheric pressure and to divide the envelope 11 into a plurality of channels 12. A beam guide assembly, including spaced parallel beam guide meshes 22 and 23, a focus mesh 27, and an acceleration mesh 28 extends transversely across and longitudinally along each of the channels 21. A line cathode 26 is supported by a cathode support 29 and is arranged to emit electrons into the spaces 24 between the guide meshes 22 and 23 in each channel 21 so that the electrons propagate the lengths of the channels. The channels 21 each include an electron gun for the three colors used to produce a color display. The electron guns include a portion of the line cathode and electrodes which are biased to cause electrons to enter the spaces 24. Each of the meshes 22, 23, 27 and 28 contains a plurality of apertures 32, which are arranged in columns longitudinally along the meshes and in rows transversely across the meshes. Disposed on the inside surface of the back plate 17 is a plurality of extraction electrodes 33, which extend transversely across the entire transverse dimension of the envelope 11. When a particular line of the visual display is to be printed on the display screen 12, a negative voltage is applied to one of the extraction electrodes 33 so that the electrons are ejected from between the guide meshes 22 and 23 of every channel and travel to the screen 12 to produce one line of the visual display. Accordingly, each of the channels 21 contributes to the entire line of the visual display and for this reason uniform brightness control across the visual display is required.

Figure 2:
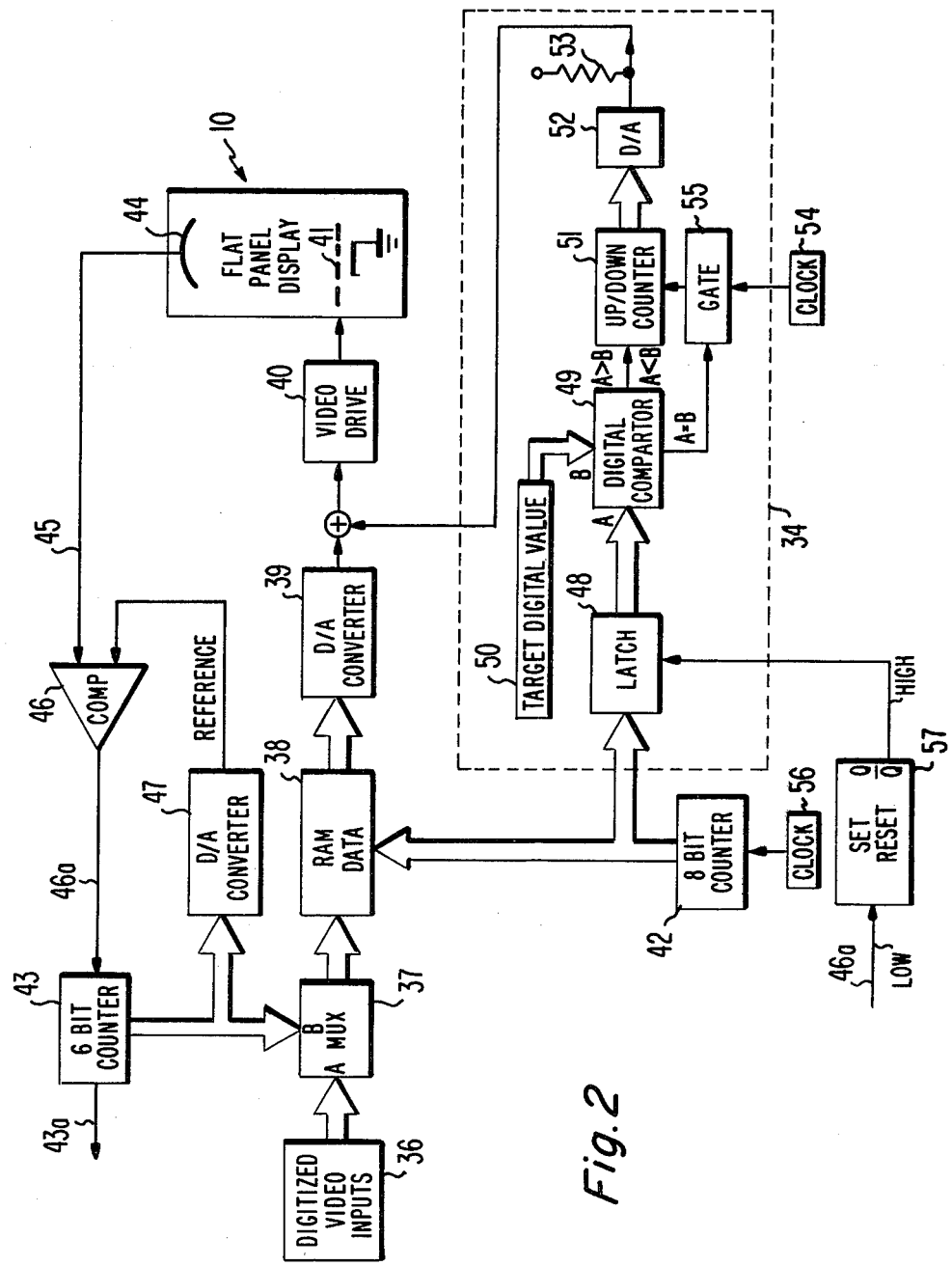

FIG. 2 shows a preferred embodiment of a circuit 34 for compensating for the transfer characteristic variations of the electron guns of a modular display device incorporated into a uniform brightness control system of the type described in the Marlowe patent. A buffer register 36 receives the digitized video input signals which are applied to the A input of the multiplexer 37. The multiplexer 37 operates in much the same manner as an OR gate, but provides isolation between the two input terminals A and B. A random access memory (RAM) 38 stores the various brightness levels necessary for generating the electron beams which will illuminate the screen of the display device to the desired levels. The digitized video input signals are fed to the RAM 38 through the multiplexer 37. The digitized output of the RAM 38 is applied to a D/A converter 39 where the digital signal is converted to an analog signal which is applied to a video drive circuit 40. The output of the drive circuit 40 is applied to the grid 41 of an electron gun so that the grid is modulated with the desired brightness signal.

Uniform brightness is achieved by use of a single reference signal generation circuit for the system and a separate RAM for every electron gun in the display device. Every reference signal generation circuit includes a 6 bit counter 43, a digital-to-analog converter 47 and a comparator 46 in cooperation with an 8 bit counter 42 and an electron collector 44 within the display device 10. The reference signal generation circuit functions to load brightness drive voltages in the RAM 38 during vertical retrace when no visual output is being generated.

At initial startup, both the 6 bit counter 43 and the 8 bit counter 42 are set at zero. Upon startup the 6 bit counter 43 provides a minimum brightness reference signal which is converted to an analog signal by the D/A 47 and applied as a reference signal to one input terminal of the comparator 46. At the same time the 8 bit counter 42 is clocked and loads a digital brightness drive signal into the first address of the RAM 38. This drive signal is applied to the D/A 39 and after conversion to an analog signal drives the grid 41 through the video drive circuit 40. Electrons are emitted by the cathode in proportion to the level of the drive voltage and because no display is being generated, the electrons are collected by the collector 44. A line 45 couples the collector 44 to the other input terminal of the comparator 46 so that a voltage proportional to the electron beam current is applied to the comparator 46. The comparator 46 does not generate an output pulse until the voltage from the collector 44 exceeds the reference voltage from the D/A 47.

The 8 bit counter 42 incrementally raises the drive voltage applied to the grid 41 so that the voltage from the collector 44 ultimately exceeds the reference voltage provided by the 6 bit counter 43 through the D/A 47. The 8 bit counter 42 provides 256 equal incremental drive voltages. Upon initial startup the first, or lower, of the drive voltages is applied to the grid 41 through the first address of the RAM 38, the D/A 39 and the video drive circuit 41. When the voltage from the collector 44 is below the reference signal the comparator 46 does nothing. The next incremental drive voltage from the 8 bit counter 42 is applied to the grid 41 slightly raising the voltage on the collector 44. The voltage to the comparator 46 from the collector 44 is thus gradually raised by the 8 bit counter 42 in small increments until the reference signal from the 6 bit counter 43 is exceeded causing the comparator 46 to provide a trigger signal to the 6 bit counter 43. The trigger signal from the comparator 46 advances the 6 bit counter 43 one step and several results simultaneously occur. A different and higher reference signal is applied to the comparator 46 by the D/A converter 47. Also, the RAM 38 is advanced to the next address and the incremental drive voltage from the 8 bit counter 42 which caused the firing of the comparator 46 is stored in the first address of the RAM 38.

The 8 bit counter 42 continues to incrementally raise the collector 44 voltage until the second reference voltage from the 6 bit counter 43 is exceeded and the system advances to the third reference voltage and the third address of the RAM 38 while the second drive voltage is stored at the second address of the RAM 38 and the process repeated.

The counter 43 is a 6 bit counter and, therefore, 64 reference signals are provided so that 64 of the 256 drive voltages from the 8 bit counter can be stored in the RAM 38. However, the composite transfer characteristics of the electron guns and the associated drive circuitry are not uniform and, therefore, the 256 step drive voltage range must be sufficiently broad to include both the minimum and maximum drive voltages for every electron gun. The drive voltage range is divided into 256 equal increments and accordingly the resolution for each increment decreases as the voltage range increases.

Figure 3:
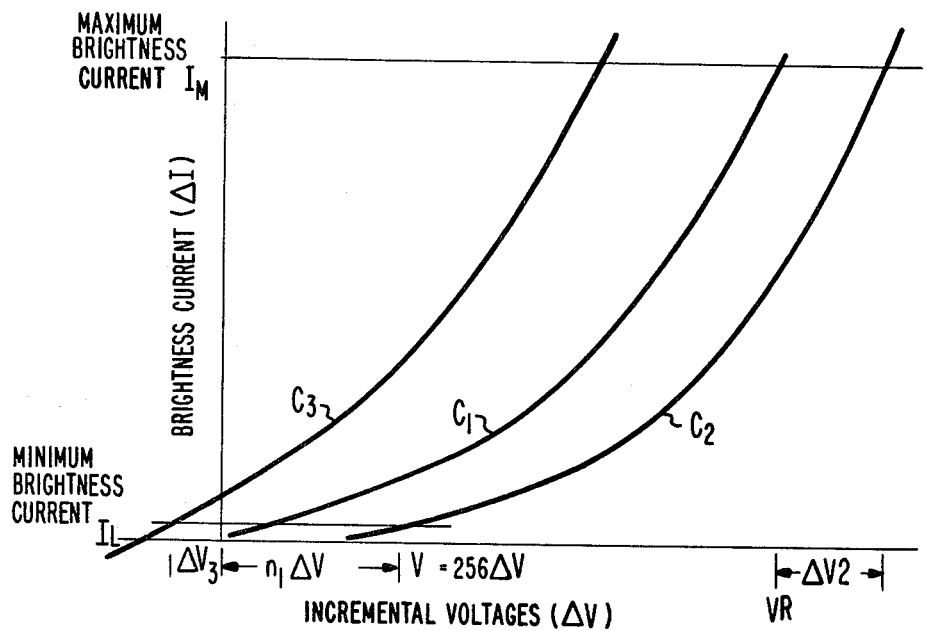
FIG. 3 shows the variation in the transfer characteristics of several electron guns.

FIG. 3 shows the composite transfer characteristics for three electron guns. The drive voltage $V_R$, which is divided into the 256 incremental drive voltages $\Delta V$ is plotted along the abscissa and the display brightness currents along the ordinate. The curve C1 represents the composite transfer characteristic of an electron gun and the associated circuitry which functions as desired within a voltage range $V_R$. The curve C1 crosses the minimum brightness current level $I_L$ at a low voltage value so that only a few of the incremental voltages $\Delta V$ are expended to store the first of the 64 reference brightness levels. Additionally, the maximum brightness current level $I_M$ is reached on the 256th incremental voltage. Therefore, the full 64 brightness levels from the counter 43 are stored within the $V_R$ voltage range and the system resolution is acceptable. The system resolution is defined by the $\Delta I/I$ ratio, and because the $\Delta V/\Delta I$ slope of the characteristic is a constant, increases in $\Delta V$ result in increases in $\Delta I$ so that the resolution decreases.

The curve C2 represents a composite transfer characteristic which reaches the minimum brightness current level $I_L$ at a higher voltage level and which, therefore, requires a larger number of the incremental voltages $\Delta V$ to store the first reference voltage. A number $n_1$ (such as 100) of the incremental voltages $\Delta V$ is required to store the first reference voltage from the counter 43 and the slope of the characteristic is such that the maximum brightness current $I_M$ is not reached when the last of the 256 incremental voltage is provided. Accordingly, the upper limit of the system drive voltage range $V_R$ must be increased by the voltage $\Delta V2$ in order to include the gun having the C2 transfer characteristic. This results in a loss of resolution because each of the 256 incremental voltages $\Delta V$ must be enlarged to accommodate the increased drive voltage range. The system resolution ratio $\Delta I/I$, therefore, also increases and the system resolution decreases.

The curve $C_3$ represents a composite transfer characteristic which reaches the minimum brightness current $I_L$ at a voltage lower than the lower limit of the $V_R$ range and the slope of the characteristic is such that the maximum brightness current $I_M$ is reached before the 256th incremental voltages is provided. Accordingly, the lower limit of the system drive voltage range $V_R$ must be decreased by the voltage $\Delta V_3$ in order to include the gun having the $C_3$ transfer characteristic. The voltage range $V_R$ for a system including the $C_1$, $C_2$ and $C_3$ transfer characteristics, therefore, would have to be $VR + \Delta V_2 + \Delta V_3$. The $\Delta V$ influence on the system resolution ratio $\Delta I/I$ would be $\Delta V = (VR + \Delta V_2 + \Delta V_3)/256$ which is a substantial decrease of resolution compared to $V_R/256$ when the $V_R$ range can be employed for the system. The instant invention permits the use of the $V_R$ voltage range irrespective to the transfer characteristics of the electron guns. The need for the $\Delta V_3$ range expansion is negated by the use of a compensation circuit which has the effect of shifting the low end of all the characteristic curves to cross the minimum current $I_L$ at a voltage level equal to two (for example) of the incremental voltages $\Delta V$. A similar compensation circuit causes all the characteristics to reach the maximum current $I_M$ at a voltage level which is two (for example) of the incremental voltages $\Delta V$ lower than the high level of the voltage range $V_R$.

The loss of resolution caused by the electron gun transfer characteristics reaching the minimum current $I_L$ at different voltages is overcome by utilizing the adaptive circuit 34 shown in FIG. 2 to establish for all the electron guns a target digital value which represents the lowest voltage at which all gun characteristics reach the minimum brightness current $I_L$. The adaptive circuit 34 adjusts the bias voltage on the grid 41 so that the minimum brightness drive voltage stored in the first address of the RAM 38 is a target value close to zero and is sufficient to fire the comparator 46 on a selected one of the incremental voltages $\Delta V$ from the 8 bit counter 42. A small, but not zero, value is selected as the target value because if zero were used the polarity of the error could not be detected. Accordingly, the target value is selected to be very close to the lowest of the 256 incremental drive voltages output by the 8 bit counter 42, for example the target value preferably is set at the second or third incremental drive voltage. The use of a target value has the effect of shifting the transfer characteristic curves of FIG. 3 along the abscissa so that the minimum brightness current $I_L$ is two incremental voltages $\Delta V$ from the Y axis, irrespective of the characteristic of the electron gun. Thus the $C_2$ characteristic would be shifted to the left and the $C_3$ characteristic to the right.

In FIG. 2a latch circuit 48 receives the digitized incremental drive signals from the 8 bit counter and provides them to the A input of a digital comparator 49. The latch circuit 48 also receives a strobe signal from the output of the comparator 46 through a Set/Reset Latch 57. When the signal on the output line 46a of the comparator 46 is low the signal on the $\overline{Q}$ output terminal of the Set/Reset is high and is used as the strobe signal to the latch circuit 48. In this condition the digital voltages from the 8 bit counter 42 are passed to the digital comparator 49. When the comparator 46 fires the strobe signal goes low and the output of the latch 48 remains fixed at the incremental voltage which resulted in the firing of the comparator 46. The comparator 49 also receives the target digital value 50 on the B input terminal. The target value is a fixed set of 0's and 1's which correspond to the four least significant bits of the incremental voltage from the 8 bit counter 42 which is selected as the minimum brightness level. Thus, when the second lowest incremental voltage is selected the target digital signal is 0010. The output of the comparator 49 is applied to an up/down counter 51, the output of which is applied to a D/A converter 52. As explained more fully hereinafter when the input signals to the A and B terminals of the comparator 49 are different the counter 51 is set to count either upwardly or downwardly, depending upon the polarity of the difference. When the A and B inputs are equal an inhibit signal is provided to a gate 55 and the clock 54 is inhibited from providing pulses to the counter 51. When the A input to the comparator 49 exceeds the B input the counter 51 is set to count up upon the reception of pulses from the gate 55. Also, the counter 51 counts down when the B input exceeds the A input. Thus, the output of the counter 51 changes upon the reception of pulses from the gate 55 with the direction of change being determined by the polarity of the input from the comparator 49. Accordingly, when no pulses are received from the gate 55 the output of the counter 51 remains fixed at the level which exists when the clock 54 stopped clocking. The counter 51 and D/A 52 thus function as a stable digital potentiometer the setting of which is increased and decreased by the gate 55 as dictated by the polarity signal from the comparator 49.

The analog output of the D/A converter 52 is applied to the video drive circuit 40, changing the bias voltage on the video drive 40. The output from the D/A 52 thus has the effect of shifting the composite transfer characteristics of FIG. 3 so that all cross the minimum current level $I_L$ at the same incremental voltage. The firing of the comparator 46 advances the 6 bit counter 43, thus applying a higher reference voltage to the comparator 46 and advancing the RAM 38 to the next address. Accordingly, the minimum brightness drive voltage stored in the RAM 38 provides a signal to the comparator 46 which always exceeds the lowest reference voltage from the 6 bit counter 43 while using only two of the incremental drive voltages $\Delta V$ from the 8 bit counter 42. The uniform brightness control system functions in the same manner as described above in reference to the Marlowe patent after the output of the counter 51 changes the drive voltage from the video drive 40.

If desired, a range resistor 53 can be utilized to more rapidly set the input to the video drive 40 to the minimum brightness value. The resistor 53 is biased with a constant dc voltage which provides a nominal minimum brightness value so that the required adjustment from the counter 51 is minimized.

Figure 4:
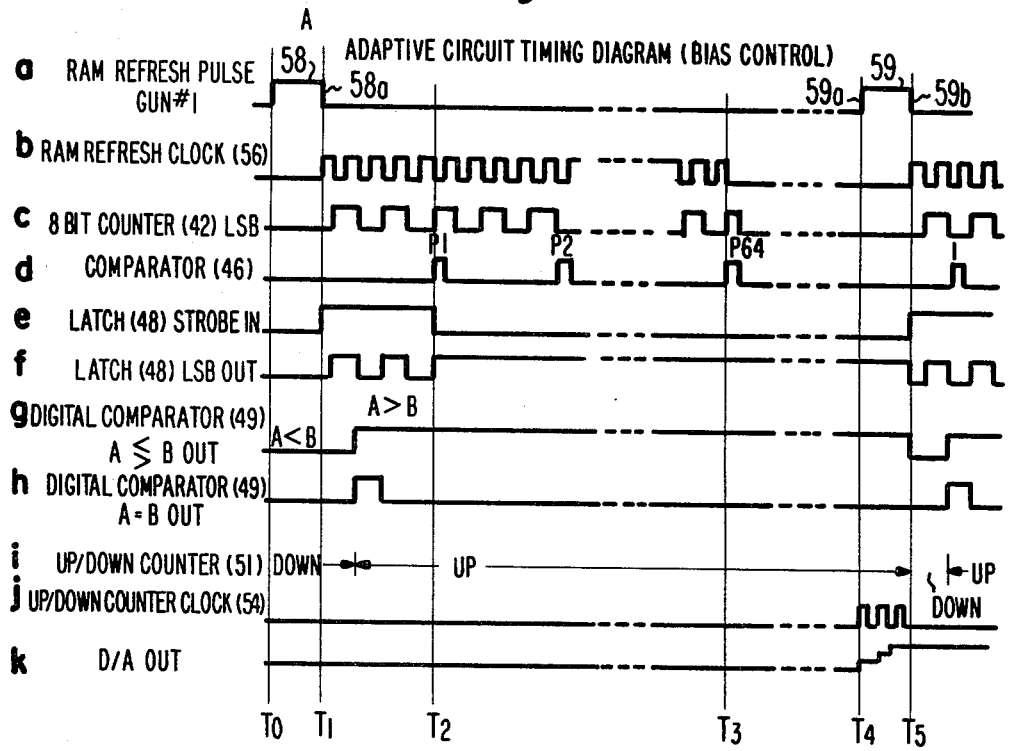
FIGS. 4a to 4k are a pulse train timing diagram of the instant invention.

A full understanding of the operation of the adaptive video circuit 34 is obtained by referring to FIGS. 2 and 4a through 4k. In FIG. 4a, upon initial start-up of the system, a RAM refresh pulse 58 begins at time $T_0$. Such pulses are utilized in all television sets and the generation is well known in the art. The trailing edge 58a occurs at time $T_1$ and implements several events. The multiplexer 37 is switched to the B input from the 6 bit counter 43 and the RAM 38 is put into the write mode. Also, the RAM refresh clock pulse train shown in FIG. 4b is supplied by the clock 56 to the 8 bit counter 42 and the RAM 38 receives the incremental voltages $\Delta V$ from the 8 bit counter. The FIG. 4e strobe input to the latch 48 is high, and the FIG. 4c input to the latch is also the output shown in FIG. 4f.

The input to terminal A of the comparator 49 is lower than the input to terminal B and a "count down" signal is provided to the counter 51 as shown in the first portion of the FIGS. 4g and 4i $T_1$ time frame.

The above conditions exist as the 8 bit counter 42 provides the incremental voltages $\Delta V$. When the incremental voltage value is the same as the target digital value 50 the A and B inputs to the comparator 49 are equal and the pulse shown in FIG. 4h is provided to inhibit the gate 55. As shown in FIGS. 4g, and 4i respectively, the output from the comparator 49 (the input to the counter 51) switches to a high, and the counter 51 is set to count up.

The 8 bit counter 42 continues to provide the incremental voltages but no changes occur until time $T_2$ when the output from the collector 44 exceeds the reference signal from the 6 bit counter 43. The time $T_2$ is determined by the firing of the comparator 46 and thus typically will vary in time for each electron gun. At $T_2$ the 6 bit counter 43 provides a new reference signal. The incremental voltage which fired the comparator is stored in the RAM 38 and the latch 48 is set so the output is the same as the four least significant bits of the data stored in the RAM.

The Marlowe brightness control system continues to operate in the manner described above until the 64th reference voltage is exceeded at time $T_3$ when several events occur; the MUX 38 is switched to the A input and the RAM 38 is switched to the display mode and the RAM clock is inhibited. The time period between $T_2$ and $T_4$ is used to refresh all other RAM's of the Marlowe system in the same manner described for the RAM 38 and to display video. It should be noted that during the initial refresh cycle described above, the adaptive video circuit has not provided any compensation to the video drive circuit 40.

At time $T_4$ the rise side 59a of a second refresh pulse 59 (FIG. 4a) begins the second refresh cycle with the enablement of the clock 54. The counter 51 begins to count up (FIG. 4i) for the duration of the refresh pulse. The output of the counter 51 is converted by the D/A 52 and used to adjust the bias voltage of the video drive 40. The number of clock pulses supplied to the counter 51 is a predetermined number so that the change in drive voltage to the grid 41 is also predetermined. In some instances it may be necessary to adjust the counter 51 output more than one time before full correction is obtained. However, because of the range voltage applied by the resistor 53 typically only one correction is required. At time $T_5$ the trailing edge 59b of the refresh pulse 59 disables the clock 54 and a second refresh cycle similar to the first refresh cycle described above is entered into. At the time $T_4$ the counter 51 began an up count because of the setting during the first cycle. Thus, in FIGS. 4g, 4h and 4i the comparator received equal A and B inputs and changed from low to high thereby switching the counter 51 from count down to count up. This change occurred because the first comparison pulse $P_1$ (FIG. 4d) from the comparator 46 occurred after the A=B output form the counter 51. In instances where the electron gun transfer characteristic results in a comparison before the A=B signal the counter state will not be changed and will count down starting at time $T_4$ reducing the drive voltage to the grid 41. Accordingly, the minimum current $I_L$ crossing of FIG. 3 will be shifted either right or left depending upon the composite transfer characteristic associated with the electron gun being adapted.

A similar adaptive circuit can be used to assure that all the transfer characteristics cause the maximum brightness current $I_M$ at the same incremental voltage $\Delta V$. This level also varies because of the non-uniform composite transfer characteristics of the electron guns and the associated analog circuitry. In FIG. 3 all the transfer characteristics will cross the maximum brightness current $I_M$ at the same $\Delta V$ increment. However, because the actual composite transfer characteristics of the electron guns cannot be changed, the effect of the adaptive circuit is that of rotating the transfer characteristic curves about the crossing of the minimum current $I_L$ so that the slopes of the curves are changed. The target digital value 50 set into the comparator 49 is set just below the highest incremental voltage $\Delta V$, such as the 254th increment, and a circuit otherwise identical to the circuit 34 is also added to the Marlowe system. The latch circuit 48 is set to latch onto the four least significant bits of the highest incremental drive voltage which is stored in the RAM 38. The additional digital comparator then compares the incremental drive voltages from the 8 bit counter 42 with the selected maximum target level and actuates an additional up/down counter to control the gain of the video drive circuit 40 for the maximum value. When the 6 bit counter 43 is stepped to the last, or 64th step, the highest incremental voltage is stored in the RAM 38. When the succeeding input is received from the comparator 46 the counter 43 provides an overflow signal on line 43a. This signal is applied as the strobe signal to the latch circuit 48 to latch onto the highest stored incremental voltage. During the next refresh cycle the higher drive voltage to the grid 41 is adjusted to set the maximum brightness current $I_M$ to occur at the stored voltage value.

The utilization of two of the adaptive circuits 34 results in the minimum and maximum brightness levels across the entire display being accurately referenced to common values while expending as few as four of the 256 incremental drive voltages available from the 8 bit counter 42. This is a marked advance over the Marlowe system where the number of incremental drive voltages at the low brightness end is determined by the electron gun with the lowest cutoff voltage and where in many instances the full incremental resolution is not obtained.

FIG. 5 is a preferred embodiment in which one digital comparator 61 is used for both minimum and maximum brightness levels and which operates consistently with the timing diagram of FIGS. 4a through 4k. The comparator 61 receives the incremental voltages $\Delta V$ from the 8 bit counter 42 on the A input terminal. A minimum target digital value 62 and a maximum target digital value 63 are applied to the B input terminal through a digital switch 64, commonly available in the art. The target digital value is switched from 62 to 63 after the bias control is latched; thus, the pulse $P_1$ of FIG. 4d can be used to effect this switching. The comparison signal A>B or A<B is available on the C output terminal and the A=B comparison on the D output terminal. A minimum brightness current $I_L$ latch 66 and a maximum brightness current $I_m$ latch 67 receive the output signal on the C terminal of the comparator 61 over line 68. The output signal on the D terminal is applied to the two latch circuits 66 and 67 over line 69.

The latch 66 receives a strobe signal when the first reference signal from the comparator 46 (FIG. 2) is exceeded while the latch 67 receives the 6 bit counter overflow signal as a strobe signal 72 after the 64 reference voltages 41 in the 6 bit counter 43 are exceeded. An up/down counter 73 is set to count by the output of the latch 66. The counter counts upon reception of clock pulses from the clock 76 through a gate 74. The gate 74 also receives the A=B signal from the latch 66 to inhibit clocking to the counter. A D/A 77 receives the output of the counter 73 and applies an analog signal to the bias control of the video circuit 40.

An up/down counter 78 is set by the latch 67 and is clocked by a clock 81 through a gate 79 which also is inhibited by the A=B signal from the comparator 61. The output of the counter 78 is converted to an analog signal in a D/A 82 and used to control the gain of the video drive circuit 40. Accordingly, the transfer characteristics of all electron guns cross both the minimum $I_L$ and maximum $I_m$ brightness current levels at the same incremental voltages $\Delta V$ in the same manner as described hereinabove for the FIG. 2 embodiment but only one comparator 61 is required.

I claim:

1. In a system for biasing the grids of electron guns in a display device by providing digital signals representative of brightness levels for biasing said electron guns, a circuit for establishing the values of the limits of said brightness levels to compensate for variations in the transfer characteristics of said guns comprising:

means for receiving said digital signals and at least one target signal representative of at least one of said brightness levels and for providing a control signal having a polarity representative of the polarity of the difference between said digital signal and said target signal;

and means for providing an adjustment signal having a polarity in accordance with the polarity of said control signal and applying said adjustment signal to said grid so that said grid is biased in accordance with said selected brightness level.

2. The circuit of claim 1 wherein said means for receiving digital signals includes at least one latch circuit responsive to said digital signals, and comparator means responsive to said latch circuit and to said target signal for providing said control signal.

3. The circuit of claim 1 wherein said comparator means is a digital comparator.

4. The circuit of claim 1 wherein said target signal is a digital signal having Y bits corresponding to the Y least significant bits of said digital signal.

5. The circuit of claim 3 or 4 wherein said means for providing is an up/down counter responsive to the output of said comparator.

6. The circuit of claim 5 wherein said selected brightness level is the lowest level.

7. The circuit of claim 5 wherein said selected brightness level is the highest level.

8. The circuit of claim 1 wherein said means for receiving digital signals includes comparator means responsive to said digital signals and to said target signal, and at least one latch circuit responsive to said comparator means for providing said control signal.

9. The circuit of claim 8 wherein said means for providing is an up/down counter.

10. The circuit of claim 5 further including means responsive to said comparator for inhibiting said counter when said digital signals and said target signal are equal.

11. The circuit of claim 10 wherein said means for inhibiting is a gate circuit.

12. The circuit of claim 6 further including an additional circuit for establishing the highest brightness level, said additional circuit including an additional latch circuit responsive to said digital signals for receiving a digital signal representative of said highest brightness level, additional comparator means responsive to said additional latch circuit and a second target signal, and an additional up/down counter responsive to said additional comparator means.

13. The circuit of claim 12 wherein there are X of said brightness levels, said lowest level being the $\{X-(X-2)\}$ level and said highest level being the $(X-2)$ level.

14. The circuit of claim 1 wherein there are X of said brightness levels, the lowest level being the $\{X-(X-2)\}$ level and the highest level being the $(X-2)$ level, said means for receiving including comparator means responsive to said brightness levels and, wherein there are two of said target signals, and further including switching means for selectively applying said target signals to said comparator means.

15. The circuit of claim 14 further including a first latch circuit responsive to said comparator when said lowest brightness level and the first target signal are the same, and a second latch circuit responsive to said comparator when said highest brightness level and the second target signal are the same.

16. The circuit of claim 15 further including first and second digital counters individually responsive to said first and second latch circuits and first and second digital-to-analog converters individually responsive to said counters.

* * * * *